Jan. 16, 1973  J. R. GRIFFITH  3,711,351
METHOD OF IMPREGNATING INORGANIC FILAMENT STRANDS
Original Filed May 31, 1967

INVENTOR.
JAMES R. GRIFFITH
BY

ATTORNEY

United States Patent Office 3,711,351
Patented Jan. 16, 1973

3,711,351
METHOD OF IMPREGNATING INORGANIC FILAMENT STRANDS
James R. Griffith, Riverdale Heights, Md., assignor to the United States of America as represented by the Secretary of the Navy
Original application May 31, 1967, Ser. No. 643,321, now Patent No. 3,544,421, dated Dec. 1, 1970. Divided and this application Sept. 9, 1970, Ser. No. 70,808
Int. Cl. B32b *17/04*
U.S. Cl. 156—175
3 Claims

ABSTRACT OF THE DISCLOSURE

Glass filaments are continuously drawn through a solution of bifunctional acyl chloride in organic solvent and then directly through a solution of alkylene diamine and an acid acceptor in water. The filaments are dried, coated with epoxy resin and wound to form a structural laminate.

CROSS-REFERENCE TO RELATED APPLICATION

This application is a division of application Ser. No. 643,321, now U.S. Pat. No. 3,544,421, filed May 31, 1967.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Field of the invention

This invention relates to techniques for forming stress-free structural laminates and more particularly to a method of impregnating and encapsulating continuous strands of glass filaments with a thermoplastic organic polymer and then bonding together the strands with an epoxy resin.

Description of the prior art

Filament-wound glass fiber structural laminates in which the binder is a cured epoxy resin have low stress distribution due to the hard nature of the cured resin. Low stress distribution in the structural laminates result in insufficient protection for the glass filament winding against mechanical damage due to internal stress developed in the laminates by shrinkage of the epoxy resin during curing. This disadvantage would obtain for like structural laminates in which the windings are carbon, boron or other high modulus, nonmetallic inorganic filaments.

High molecular weight thermoplastic organic polymers have properties which make them well-suited as tough, flexible plastics for encapsulating glass of other high modulus, nonmetallic, inorganic filaments in filament-wound structural laminates which are bonded with cured epoxy resins. However, as preformed polymers, it is difficult to cause them to penetrate into strands of such filaments to obtain polymer coating of the filaments in the interior of the filament bundles. Extrusion coating for the purpose involves the use of expensive equipment and a viscous high polymer melt. Solvent solution coating for the purpose has the difficulty of removing large volumes of solvent from the polymer-impregnated filament bundle by rapid evaporation without incurring foaming.

SUMMARY OF THE INVENTION

Filament-wound structural laminates of high modulus, nonmetallic, inorganic filament windings bonded with cured epoxy resins are modified to have improved stress distribution by the inclusion in the laminates of a tough, flexible plastic which encapsulates the filaments, e.g. glass filaments, and intervenes between the filaments and the cured epoxy resin binder. The tough, flexible plastic is a high molecular weight, flexible, thermoplastic organic polymer, formed in place on the filaments in continuous strands by an interfacial polycondensation from an appropriate pair of starting organic bifunctional compounds.

OBJECTS OF THE INVENTION

It is a general object of the present invention to improve stress distribution in filament-wound structural laminates of glass and other high modulus, nonmetallic, inorganic filaments which are bonded with cured epoxy resin.

It is a particular object to provide improved stress distribution in filament-wound structural laminates of glass or other high modulus, nonmetallic, inorganic filament windings which are bonded with cured epoxy resins through the inclusion therein of a tough, flexible plastic which encapsulates the filaments and intervenes between the filaments and the cured epoxy resin binder.

It is a further particular object of the present invention to provide an improved method of coating glass and other high modulus, nonmetallic, inorganic filaments in strands with high molecular weight, flexible thermoplastic organic polymers which is simply and quickly carried out.

The invention will be more fully understood from the description which follows when read in conjunction with the accompanying drawing.

DESCRIPTION OF THE PREFERRED EMBODIMENTS

Figure 1:
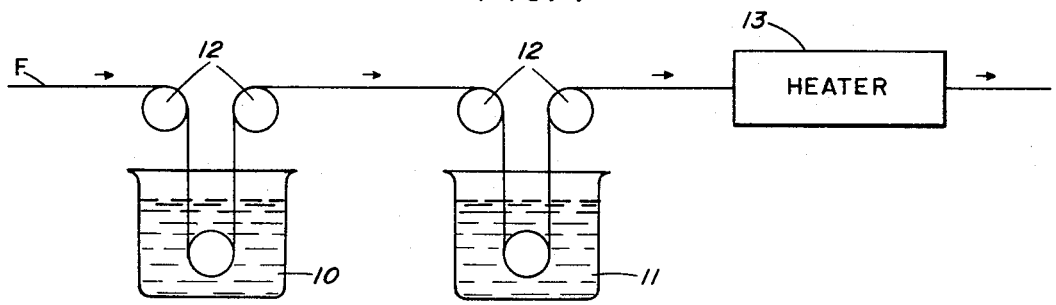
FIG. 1 is a schematic showing of an apparatus suitable for carrying out the method of impregnating continuous filament strands with a tough flexible high molecular weight linear organic polymer in accordance with the invention.

In accordance with the present invention, glass filaments in strands are encapsulated with high molecular weight, flexible, thermoplastic organic polymers formed in place in the filament strands by an interfacial polycondensation from complementary starting organic bifunctional compounds and fused on the filaments. Further in accordance with the present invention, the filament strands impregnated with the fused thermoplastic high polymers are coated with a fluid epoxy resin-curing agent mixture and wound to form the structural laminates. The epoxy resin binder is heated in the filament-wound structural laminates to complete curing of the resin.

Interfacial condensation is a known procedure for forming high molecular weight thermoplastic organic polymers, J. Polymer Science 40, 289–418 (1959). The basic idea of this polycondensation is that two solutions in which the solutes are, respectively, the one and the other of the two complementary reactants for forming the polymer and the respective solvents are mutually immiscible, will allow polymer formation at the interface when the two solutions are brought together. The solvents of the respective solutions may both be nonsolvents for the formed polymer. The solutes must be bifunctional so that linear polymer chains will form, and the reaction between the functional groups of the solutes must be essentially instantaneous when the solutes come into contact. The solubility equilibria cause high molecular weight polymers to form at the interface. The stoichiometry is not critical, as it is in other methods of linear polymerization. If the two appropriate solutions, in which the solvents are nonsolvents for the formed polymer, are brought into contact so that contiguous layers of the solutions are established, a polymer film will immediately appear at the interface and the reaction stops due to the barrier presented by the formed polymer. If this barrier is disrupted, a new one forms instantly.

High molecular weight flexible thermoplastic organic polymers suitable for use in forming the tough, flexible plastic matrix for encapsulating high modulus, nonmetallic, inorganic continuous filaments in strands in accordance with the present invention are, for example, high molecular weight, flexible, thermoplastic linear polycarbonamides, polysulfonamides and polyurethanes. A preferred group of high molecular weight, flexible, thermoplastic linear polyamides for the matrix are those in which the polymer chain is formed by carbonamido groups connected by an alkylene radical having from 2 to 18 carbon atoms, for example, a high molecular weight poly(tetramethylene sebacamide), poly(pentamethylene adipamide), poly(hexamethylene sebacamide), etc.

In forming the high molecular weight, flexible thermoplastic linear organic polymers in strands of high modulus, nonmetallic, inorganic filaments following the present invention, starting complementary pairs of bifunctional acyl chlorides and alkylene diamines are used which are known to form, or are capable of forming, the aforesaid high polymers in an interfacial polymerization when brought together as separate solutions in appropriate solvents, which, in the case of the bifunctional acyl chlorides, is a water-immiscible volatile organic solvent which is nonsolvent for the formed high polymer and in the case of the diamines is water, and in the presence of an acid acceptor for binding HCl. Liquid chlorinated hydrocarbons such as methylene chloride, carbon tetrachloride and sym. tetrachloroethane, etc. are suitable volatile organic solvents for the bifunctional acyl chlorides in the interfacial polycondensation. The acid acceptor may be, for example, an excess of the diamine or sodium carbonate and is used in an equivalent amount for binding the HCl formed in the condensation reaction between the bifunctional acyl chloride and the alkylene diamine.

In conducting the interfacial polycondensation following the present invention, the filament strand is drawn in continuous manner through a solution of the bifunctional acyl chloride in the water-immiscible volatile organic solvent and then directly (the strand is still wet) through a solution of the alkylene diamine in water which also contains the acid acceptor. The concentration of the bifunctional reactants in the solutions is not critical. Suitable concentrations are from about 0.25 to 2.5 molar. The solutions may be at room temperature. The low viscosity of the two reactant solutions allows them to rapidly penetrate the filament bundle to establish contiguous layers of the two solutions on and between the filaments in the strand. The higher polymer is instantly formed at the interface of the contiguous solution layers and deposits on and between the filaments in the strand. Deposition of the formed high polymer from the solvents of the solutions allows the solvents to be easily removed from the polymer impregnated strand by a simple evaporation.

The strand impregnated with a high polymer in the manner described above is heated to a temperature slightly above the fusion point of the polymer to evaporate the solvents and fuse the polymer in the strand. Fusion of the high polymer provides a tough, flexible matrix in which the filaments are embedded.

Referring now to the drawings, the apparatus as shown in FIG. 1 comprises containers 10 and 11 for holding the respective solvent solutions of the starting complementary organic bifunctional compounds for forming the flexible thermoplastic high molecular weight linear polymers by the interfacial polymerization. Rollers 12 are mounted and arranged to guide the continuous filament strand F through the solutions in the two containers and through a heater 13. The heater is suitably an elongated tube of a high silica glass such as Vycor about which is coiled an electrical heating element and an outer wrapping of asbestos for heat insulation. The inner diameter of the heater tube is such as to allow air flow through the tube for promoting venting of solvents evaporated from the polymer impregnated strands. A heater tube 1½ feet in length and having an inner diameter ½ inch is suitable for solvent evaporation and fusing of the formed thermoplastic high polymer in filament strands which are moved at a rate of from about ¼ to 3 feet/second through the tube. Means (not shown) are provided for drawing the filament strands from a feed spool at a controlled rate of pass through the solutions and the heater to storage and includes an electric motor-driven take-up spool and a magnetic brake strand tension device and level-wind.

The invention is further illustrated by the following specific example which is typical of the application of the method for impregnation of high modulus, nonmetallic, inorganic filament strands with a tough flexible plastic which is a high molecular weight, flexible, thermoplastic, linear organic polymer formed in place in the filament bundle. The apparatus used was as described above.

EXAMPLE

A strand of 8 glass filaments, an average filament count 204, was drawn from the feed spool in continuous manner and in sequence through a body of a 0.25 molar solution of sebacoyl chloride in carbon tetrachloride in the container 10, a body of a 0.8 molar solution of hexamethylene diamine in water in the container 11 and through the heater 13 to the take-up spool. The rate of pass of the filament strand through the treatment solutions and the heater was 1 foot per second. The formed flexible, linear high polymer, poly(hexamethylene sebacamide) precipitated from the solvents to deposit on and between the filaments in the strand. The heater was operated at 220° C. to evaporate the solvents and fuse the formed deposited high polymer in the glass filament strand. An excess of the diamine in the water solution was used as the acid acceptor for binding the HCl formed in the condensation reaction.

In the manner of the above example, strands of glass filaments are impregnated with, for example, a tough, flexible, high molecular weight, linear polysulfonamide by using a 0.125 molar solution of metabenzenedisulfonylchloride in methylene chloride for the first bath and 0.156 molar solution of hexamethylene diamine in water for the second bath which also contains a 0.30 molar quantity of sodium carbonate as the acid acceptor for binding the HCl formed in the condensation reaction, and with a tough, flexible, high molecular weight, linear polyurethane by using a 1.65 molar solution of ethylene bis (chloroformate) in methylene chloride as the first bath and a 0.52 molar solution of piperazine in water as the second bath which also contains a 1 molar quantity of sodium carbonate as acid acceptor for binding the HCl from the condensation reaction, and fusing the formed high polymers in the strands by heating them at a temperature which is slightly above their fusion point.

Figure 2:
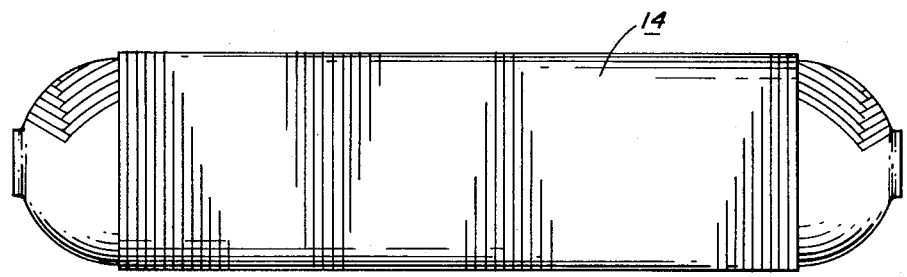
FIG. 2 is a showing by way of illustration of one form of filament-wound structural laminates in which improved strand windings of the invention may be embodied.

In the forming of filament-wound structural laminates following the present invention, for example, like one of the geometry and arrangement of filament windings as illustrated at 14 in FIG. 2, a strand of high modulus, nonmetallic inorganic continuous filaments is impregnated with a fused tough, flexible high molecular weight thermoplastic linear organic polymer in the manner described above. The strand is subsequently coated with a fluid mixture of an epoxy resin and a curing agent and wet-wound in known ways on the former or mandrel of a filament winding apparatus. The filament-wound structural laminates, so formed, are then heated to cure the epoxy resin and bond the filament strand in the structures. Heat curing of the epoxy resin in the laminate structures is preferably accomplished in a two step procedure in which the laminate structure is first heated for a short period of time, e.g. 1 hour, at a lower temperature and then for a more extensive period of time, e.g. 3 hours, at a substantially higher temperature.

The epoxy resin-curing agent mixtures used in forming the filament-wound structural laminates may be those heretofore used in the art, for example, a fluid mixture of the diglycidyl ether of bisphenol A, 2,2-bis(4-hydroxyphenyl) propane, and meta-aminobenzylamine in the proportions by weight of 100 parts of the diglycidyl ether to 16 to 20 parts of the diamine. Application of an epoxy resin-curing agent mixture to the filament strands impregnated with a fused, tough, flexible thermoplastic high polymer may be made in conventional way by drawing the strands through a bath of the fluid epoxy resin-curing agent mixture at a controlled rate which may be, for example, at from about ¼ to 3 feet/second. In wet filament winding, this rate is determined by the rate of operation of the filament winding apparatus, It is, of course, independent of the rate of operation of the winding apparatus for prepreg filament winding.

Figure 3:
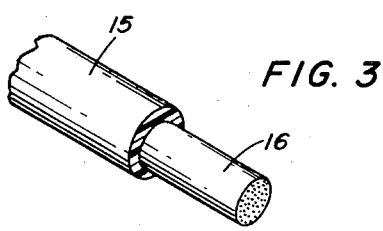
FIG. 3 is a pictorial representation of a strand of filaments embedded in a matrix of a fused, tough, flexible, thermoplastic linear high polymer in accordance with the invention with an outer coating of a fluid mixture of epoxy resin and curing agent.

The arrangement of a coating 15 of a fluid mixture of an epoxy resin-curing agent on a strand of continuous high modulus, nonmetallic inorganic filaments which are embedded in a matrix 16 of a fused, tough, flexible, high molecular weight thermoplastic organic linear polymer is depicted in FIG. 3.

A strand of glass filaments impregnated with a fused, tough, flexible thermoplastic organic high polymer by the procedure in the above example and stored on a spool was attached by simple windings to the mandrel of a conventional type filament winding apparatus. In operation of the winding apparatus, the strand was drawn through a bath of a fluid mixture of an epoxy resin and curing agent and wound to form the laminate. The epoxy resin binder was cured by heating the structural laminate in an oven for 1 hour at 65° C. and then for three hours at 120° C.

In filament-wound structural laminates of the invention, the matrix of fused, high molecular weight, thermoplastic linear organic polymer encapsulating the glass or other high modulus, nonmetallic, inorganic filaments provides, by virtue of its toughness and flexibility, enhanced stress distribution in the structural laminates with resultant increased protection to the wound filaments against mechanical damage by internal stress developed by shrinkage of the epoxy resin binder in curing.

While the invention has been described herein with reference to certain specific embodiments thereof, these are intended by way of illustration and not in limitation except as may be defined in the appended claims.

What is claimed and desired to be secured by Letters Patent of the United States is:

1. A method of impregnating a strand of high modulus, nonmetallic, inorganic filaments with a flexible, high molecular weight, thermoplastic, linear organic polymer which is formed by interfacial polycondensation from a pair of complementary bifunctional acyl chlorides and alkylene diamines in the presence of an acid acceptor for the hydrogen chloride developed in the condensation reaction, which comprises drawing the strand in continuous manner and in sequence through a bath of a solution of the bifunctional acyl chloride in a water-immiscible volatile organic solvent which is a nonsolvent for the formed polymer and through a bath of a solution of the alkylene diamine and the acid acceptor in water, and at a rate at which the polymer is formed on and between the filaments in the strands whereby the polymer is formed by a chemical reaction between the acyl chloride and the alkylene diamine.

2. A method as defined in claim 1, wherein the bifunctional acyl chloride is an alkylene dicarboxylic acid chloride having from 4 to 18 carbon atoms and the alkylene diamine has from 4 to 18 carbon atoms.

3. A method as defined in claim 1, and drawing the strand impregnated with the formed polymer through a heating zone for a time and at a temperature sufficient to evaporate the solvents and fuse the formed polymer in the strand.

References Cited

UNITED STATES PATENTS

| | | | |
|---|---|---|---|
| 3,502,533 | 3/1970 | Reiss | 260—29.4 |
| 3,544,421 | 12/1970 | Griffith | 156—169 |
| 3,513,129 | 5/1970 | Kramm | 260—29.4 |
| 2,824,828 | 2/1958 | Homer et al. | 117—107.1 X |
| 2,778,764 | 1/1957 | Morrison | 161—174 |
| 2,958,114 | 11/1960 | Marzocchi et al. | 161—175 |
| 3,042,569 | 7/1962 | Paul | 156—296 X |
| 3,305,417 | 2/1967 | Christie | 117—126 GE X |
| 3,533,870 | 10/1970 | Mackey et al. | 161—175 X |

OTHER REFERENCES

Journal of Polymer Science, vol. 40, 1959, pp. 289–418.

CARL D. QUARFORTH, Primary Examiner

E. E. LEHMANN, Assistant Examiner

U.S. Cl. X.R.

156—296, 314, 331, 333; 161—175